July 13, 1965

L. G. S. BROOKER ETAL 3,194,805

MEROCYANINE AND HOLOPOLAR DYES CONTAINING
ARYLENE-CHAIN SUBSTITUTION
Filed Sept. 2, 1960

*Fig. 1*

1-DICYANOMETHYLENE-2-(1-METHYL-2(1H)- NAPHTHO-
[1,2] THIAZOLYLIDENE) INDAN

*Fig. 2*

2-DICYANOMETHYLENE-1,3-DI(3-METHYL-2(3H)-
BENZOTHIAZOLYLIDENE) INDAN

*Fig. 3*

2-DICYANOMETHYLENE-1-[(3-ETHYL-2(3H)-BENZO-
THIAZOLYLIDENE)ETHYLIDENE]-3-[(3-ETHYL-2(3H)-
BENZOXAZOLYLIDENE) ETHYLIDENE] INDAN

*Leslie G. S. Brooker*
*Frank G. Webster*
INVENTORS

BY
ATTORNEYS

United States Patent Office 3,194,805
Patented July 13, 1965

3,194,805
MEROCYANINE AND HOLOPOLAR DYES CONTAINING ARYLENE-CHAIN SUBSTITUTION
Leslie G. S. Brooker and Frank G. Webster, Rochester, N.Y., assignors to Eastman Kodak Company, Rochester, N.Y., a corporation of New Jersey
Filed Sept. 2, 1960, Ser. No. 53,698
3 Claims. (Cl. 260—240)

This invention relates to holopolar cyanine dyes, a method for preparing such dyes and photographic silver halide emulsions spectrally sensitized with such dyes.

It is, therefore, an object of our invention to provide new holopolar cyanine dyes. Another object is to provide new holopolar cyanine dyes having different absorbing characteristics from other holopolar cyanine dyes previously described in the photographic art. Still another object is to provide photographic silver halide emulsions spectrally sensitized with the new holopolar cyanine dyes of our invention. Other objects will become apparent from a consideration of the following description and examples.

The new spectral sensitizing dyes of our invention include holopolar cyanine dyes represented by the following two general formulas:

I.

and

II.

wherein R and $R_1$ each represents a substituted or unsubstituted alkyl group (e.g., methyl, ethyl, n-propyl, n-butyl, isobutyl, n-amyl, isoamyl, β-methoxyethyl, β-ethoxyethyl, allyl (i.e., vinylmethyl), benzyl (phenylmethyl), β-phenylethyl, carboxymethyl, β-carboxyethyl, β-sulfoethyl, γ-sulfopropyl, γ-sulfobutyl, δ-sulfobutyl, etc.) (especially alkyl groups containing from 1 to 4 carbon atoms), $R_2$ represents a cyano group or an alkoxycarbonyl group (methoxycarbonyl, ethoxycarbonyl, etc., especially a lower alkoxycarbonyl group), $n$, $m$ and $p$ each represents a positive integer of from 1 to 2, $d$ and $q$ each represents a positive integer of from 1 to 3, D represents the atoms necessary to complete a benzene ring (which can be substituted, for example, by chlorine, bromine, hydroxyl, methoxyl, ethoxyl, methyl, ethyl, etc.), Q represents the non-metallic atoms necessary to complete a nucleus of the indandione series (e.g., 1,3-diketohydrindene, etc.) or a heterocyclic nucleus containing from 5 to 6 atoms in the heterocyclic ring, such as those of the pyrazolone series (e.g., 3-methyl-1-phenyl-5-pyrazolone, 1-phenyl-5-pyrazolone, 1-(2-benzothiazolyl)-3-methyl-5-pyrazolone, etc.), those of the isoxazolone series (e.g., 3-phenyl-5(4H)-isoxazolone, 3-methyl-5(4H) - isoxazolone, those of the oxindole series (e.g., 1-alkyl-2,3-dihydro-2-oxindoles, etc.), those of the 2,4,6-triketohexahydropyrimidine or 2-thio-4,6-diketohexahydropyrimidine series (e.g., barbituric acid or 2-thiobarbituric acid) as well as their 1-alkyl (e.g., 1-methyl, 1-ethyl, 1-n-propyl, 1-n-heptyl, etc.), or 1,3-dialkyl (e.g., 1,3-dimethyl, 1,3-diethyl, 1,3-di-n-propyl, 1,3-diisopropyl, 1,3-dicyclohexyl, 1,3-di-(β-methoxyethyl), etc.), or 1,3-diaryl (e.g., 1,3-diphenyl, 1,3-di(p-chlorophenyl), 1,3-di(p-ethoxycarbonylphenyl), etc.), or 1-aryl (e.g., 1-phenyl, 1-p-chlorophenyl, 1-p-ethoxycarbonylphenyl, etc.), or 1-alkyl-3-aryl (e.g., 1-ethyl-3-phenyl, 1-n-heptyl-3-phenyl, etc.) derivatives, those of the rhodanine series (i.e., 2-thio-2,4-thiazolidinedione series), such as rhodanine, 3-alkylrhodanines (e.g., 3-ethylrhodanine, 3-allylrhodanine, etc.) or 3-arylrhodanines (e.g., 3-phenylrhodanine, etc.), etc., those of the 2(3H)-imidazo[1,2-a]pyridone series, those of the 5,7-dioxo-6,7-dihydro-5-thiazolo[3,2-a]pyrimidine series (e.g., 5,7-dioxo-3-phenyl-6,7-dihydro - 5 - thiazolo[3,2-a]pyrimidine, etc.), those of the 2-thio-2,4-oxazolidinedione series (i.e., those of the 2-thio-2,4(3H, 5H)-oxazoledione series (e.g., 3-ethyl-2-thio-2,4-oxazolidinedione, etc.), those of the thianaphthenone series (e.g., 3(2H)-thianaphthenone, etc.), those of the 2-thio-2,5-thiazolidinedione series (i.e., the 2-thio-2,5(3H, 4H)-thiazoledione series) (e.g., 3-ethyl-2-thio-2,5-thiazolidinedione, etc.), those of the 2,4-thiazolidinedione series (e.g., 2,4-thiazolidinedione, 3-ethyl-2,4-thiazolidinedione, 3-phenyl-2,4-thiazolidinedione, 3-α-naphthyl-2,4-thiazolidinedione, etc.), those of the thiazolidinone series (e.g., 4-thiazolidinone, 3-ethyl-4-thiazolidinone, 3-phenyl-4-thiazolidinone, 3-α-naphthyl-4-thiazolidinone, etc.), those of the 4-thiazolinone series (e.g., 2-ethylmercapto-4-thiazolinone, 2-alkylphenylamino-4-thiazolinones, 2-diphenylamino-4-thiazolinone, etc.), those of the 2-imino-2,4-oxazolinone (i.e., pseudohydantoin) series, those of the 2-4-imidazolinedione (hydantoin) series (e.g., 2,4-imidazolinedione, 3-ethyl-2,4-imidazolinedione, 3-phenyl-2,4-imidazolinedione, 3-α-naphthyl-2,4-imidazolinedione, 1,3-diethyl-2,4-imidazolinedione, 1-ethyl-3-α-naphthyl-2,4-imidazolinedione, 1,3-diphenyl - 2,4 - imidazolinedione, etc.), those of the 2-thio-2,4-imidazolinedione (i.e., 2-thiohydantoin) series (e.g., 2-thio-2,4-imidazolinedione, 3-ethyl-2-thio - 2,4 - imidazolinedione, 3-phenyl-2-thio-2,4-imidazolinedione, 3-α-naphthyl-2-thio-2,4-imidazolinedione, 1,3-diethyl-2-thio-2,4 - imidazolinedione, 1-ethyl-3-phenyl-2-thio-2,4-imidazolinedione, 1-ethyl-3-α-naphthyl-2-thio-2,4-imidazolinedione, 1,3-diphenyl-2-thio-2,4-imidazolinedione, etc.), those of the 5-imidazolinone series (e.g., 2-n-propylmercapto-5-imidazolinone, etc.), etc. (especially a heterocyclic nucleus containing 5 atoms in the heterocyclic ring, 3 of said atoms being carbon atoms, 1 of said atoms being a nitrogen atom, and 1 of said atoms being selected from the group consisting of a nitrogen atom, an oxygen atom, and a sulfur atom), and Z and $Z_1$ each represents the non-metallic atoms necessary to complete a heterocyclic nucleus containing from 5 to 6 atoms in the heterocyclic ring, such as those selected from the group consisting of those of the thiazole series (e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)-thiazole, etc.), those of the benzothiazole series (e.g., benzothiazole, 4-chlorobenzothiazole, 5-chlorobenzothiazole, 6-chlorobenzothiazole, 7-chlorobenzothiazole, 4-methylbenzothiazole, 5 - methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), those of the naphthothiazole series (e.g., naphtho[1,2]thiazole, naphtho[2,1]thiazole, 5-methoxynaphtho[2,1]thiazole, 5-ethoxynaphtho[2,1]thiazole, 8 - methoxynaphtho[1,2]thiazole, 7-methoxynaphtho[1,2]thiazole, etc.), those of the thianaphtheno-7',6',4,5-thiazole series (e.g., 4'-methoxythianaphtheno-7',6',4,5-thiazole, etc.), those of the oxazole series (e.g., 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e.g., benzoxazole, 5-chlorobenzoxazole, 5-methylbenzoxazole, 5-phenylbenzoxazole, 6-methylbenzoxazole, 5,6 - dimethylbenzoxazole, 4,6 - dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.), those of the naphthoxazole series (e.g., naphtho[1,2]oxazole, naphtho[2,1]oxazole, etc.), those of the selenazole series (e.g., 4-methylselenazole, 4-phenylselenazole, etc.), those of the benzoselenazole series (e.g., benzoselenazole, 5-chlorobenzoselenazole, 5-methoxybenzoselenazole, 5-hydroxybenzoselenazole, tetrahydrobenzoselenazole, etc.), those of the naphthoselenazole series (e.g., naphtho[1,2]selenazole, naphtho[2,1]selenazole, etc.), those of the thiazoline series (e.g., thiazoline, 4-methylthiazoline, etc.), those of the 2-quinoline series (e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e.g., quinoline, 6-methoxyquinoline, 7-methylquinoline, 8-methylquinoline, etc.), those of the 1-isoquinoline series (e.g., isoquinoline, 3,4-dihydroisoquinoline, etc.), those of the 3-isoquinoline series (e.g., isoquinoline, etc.), those of the benzimidazole series (e.g., 1,3-diethylbenzimidazole, 1,3-diethyl-5-chlorobenzimidazole, 1,3-diethyl-5,6-dichlorobenzimidazole, 1-ethyl-3 - phenylbenzimidazole, etc.), those of the 3,3-dialkylindolenine series (e.g., 3,3-dimethylindolenine, 3,3,5-trimethylindolenine, 3,3,7-trimethylindolenine, etc.), those of the 2-pyridine series (e.g., pyridine, 5-methylpyridine, etc.), those of the 4-pyridine series (e.g., pyridine, etc.), etc.

We have also found that photographic silver halide emulsions can be usefully sensitized by incorporating therein at least one merocyanine dye selected from those represented by the following two general formulas:

III.

and

IV.

wherein R, $R_2$, n, d, Q and Z each have the values given above, and $D_1$ represents the atoms necessary to complete an indan or 1,2,3,4-tetrahydronaphthalene ring (which can have substituents on the benzene ring thereof, such as those identified above under D).

The merocyanine dyes represented by Formula III above can advantageously be prepared by condensing a compound selected from those represented by the following general formula:

V.

wherein $D_1$ and Q each have the values given above, with one molecule of cyclammonium quaternary salt selected from those represented by the following general formula:

VI.

wherein R, Z and n each have the values given above, X represents an acid anion, such as chloride, bromide, iodide, perchlorate, thiocyanate, benzenesulfonate, p-toluenesulfonate, methylsulfate, ethylsulfate, etc., and J represents an electronegative group, such as

VIa.

wherein $R_3$ represents an alkyl group (e.g., methyl, ethyl, etc.), or an aryl group (e.g., phenyl, tolyl, etc.), or VIb.

wherein s represents a positive integer of from 1 to 2, $R_4$ represents an acyl group (e.g., acetyl, propionyl, butyryl, benzoyl, etc.) and $R_5$ represents an aryl group (e.g., phenyl, tolyl, etc.).

The merocyanine dyes of Formula IV above can advantageously be prepared by condensing a compound selected from those represented by the following general formula:

VII.

with one molecule of a cyclammonium quaternary salt selected from those represented by Formula VI above.

The holopolar cyanine dyes represented by Formula I above can be prepared by condensing a merocyanine dye selected from those represented by Formula III with a cyclammonium quaternary salt represented by Formula VI. This method of preparation is capable of yielding symmetrical (Z and $Z_1$ are identical) or unsymmetrical (Z and $Z_1$ are different) dyes.

The holopolar cyanine dyes of Formula II can be prepared by condensing a merocyanine dye of Formula IV with a cyclammonium quaternary salt selected from those represented by Formula VI. Likewise, this method of preparation is capable of yielding both symmetrical and unsymmetrical dyes.

Symmetrical holopolar cyanine dyes included within the scope of Formula I can likewise be prepared by condensing one molecule of a compound of Formula V with two molecules of a cyclammonium quaternary salt represented by Formula VI. In like manner, symmetrical holopolar cyanine dyes of the type included within Formula II can be prepared by condensing one molecule of an intermediate of the type represented by Formula VII with two molecules of a cyclammonium quaternary salt of the type represented by Formula VI.

The condensations of the compounds of Formula V with those of Formula VI and the condensations of the compounds of Formula VII with those of Formula VI can be accelerated by basic condensing agents, such as trialkylamines (e.g., triethylamine, tri-n-propylamine, triisopropylamine, tri-n-butylamine, etc.), N,N-dialkylanilines (e.g., N,N-dimethylaniline, N,N-diethylaniline, etc..), N - alkylpiperidines (e.g., N - methylpiperidine, N-ethylpiperidine, etc.), etc. The condensations can also be carried out in the presence of an inert diluent (depending somewhat on the solubility of the intermediates in the diluent), such as the lower alcohols (e.g., ethanol, n-propanol, isopropanol, n-butanol, etc.), pyridine, quinoline, isoquinoline, 1,4-dioxane, etc. Basic diluents, such as pyridine, quinoline, isoquinoline, etc., are especially useful. Heat accelerates the condensations, although it has been found that temperatures varying from ambient (ca. 25° C.) to the reflux temperature of the reaction mixture can be employed.

The intermediates of Formula V above can advantageously be prepared by condensing a compound selected from those represented by the following general formula:

VIII.

wherein $D_1$ has the values given above, with an intermediate of the following general formula:

IX.

wherein Q has the values given above.

The intermediates of Formula VII above can advantageously be prepared by condensing a compound represented by Formula VIII with a compound represented by the following general formula:

X.

wherein $R_2$ has the values given above.

The condensations of the compounds of Formula VIII with those of Formula IX or X can advantageously be carried out in the presence of a mixture of ammonium acetate and acetic acid. Generally, an inert diluent, such as chloroform, diethyl ether, etc. can be employed. Heat accelerates the condensations although temperatures varying from room temperature to about the refluxing temperature of the reaction mixture can be employed.

In preparing the merocyanine dyes of Formula III and those of Formula IV, it is apparent that the intermediates of Formulas V and VII need have only one reactive methylene group, as indicated in the formulas. However, in preparing the holopolar dyes of Formula I and Formula II, it is apparent that the intermediates of Formula V and Formula VII must have two reactive methylene groups. Intermediates of Formula V having two reactive methylene groups can be represented by the following general formula:

XI.

wherein D, Q and p each have the values given above. The intermediates fo Formula VII having two reactive methylene groups can be represented by the following general formula:

XII.

wherein $R_2$, D and p each have the values given above.

The following examples will serve to illustrate the preparation of the intermediates and sensitizing dyes of our invention, as well as the sensitizing action of these dyes when incorporated in ordinary photographic silver halide emulsions.

*Example 1.—1-dicyanomethyleneindan*

A mixture of 39.6 g. (1 mol.) of 1-indanone, 19.8 g. (1 mol.) of malononitrile, 2.5 g. of ammonium acetate, 4 ml. of acetic acid and 40 ml. of chloroform was heated at the refluxing temperature until approximately 5.4 ml. of water was collected in a Dean and Stark distillation receiver. The chloroform solution was concentrated to dryness and the solid was recrystallized from methanol. The yield of grayish-white crystals was 65% and they had a M.P. or 147–148° C.

*Example 2.—2-dicyanomethyleneindan*

A mixture of 19.8 g. (1 mol.) of 2-indanone, 11.0 g. (1 mol. plus 10% excess) of malononitrile, 2.5 g. of ammonium acetate, 4 ml. of acetic acid and 100 ml. of chloroform was heated at the refluxing temperature for 30 minutes. The water was collected in a Dean and Stark distillation receiver. The reaction mixture was concentrated to dryness and the residue was stirred in water, and then in two successive portions of methanol. The solid was collected on a filter and washed with methanol. The yield of tan crystals was 73% and they had a M.P. of 190–193° C.

*Example 3.—1,3-diethyl-5-(indan-2-ylidene) barbituric acid*

A mixture of 19.0 g. (1 mol.) of 2-indanone, 26.5 g. (1 mol.) of 1,3-diethylbarbituric acid, 2.5 ml. of piperidine and 100 ml. of ethanol was heated at the refluxing temperature for two hours. The reaction mixture was chilled, the solid was collected on a filter and washed with methanol. After one recrystallization from ethanol, the yield of colorless needles was 47% and they had a M.P. of 165–167/ C.

*Example 4.—1-dicyanomethylene-1,2,3,4-tetrahydronaphthalene*

A mixture of 36.4 g. (1 mol.) of 1-tetralone, 13.2 g. (1 mol.) of malononitrile, 2.5 g. of ammonium acetate, 4 ml. of acetic acid and 100 ml. of chloroform was heated at the refluxing temperature for 16 hours. The water was collected in a Dean and Stark distillation receiver. The reaction mixture was concentrated to dryness and the residue stirred in water. The water was decanted and the residue was stirred in ethanol. The solid was collected on a filter and washed with ethanol. The yield of colorless crystals was 48% and they had a M.P. of 107–108° C.

*Example 5.—2-dicyanomethylene-1,2,3,4-tetrahydronaphthalene*

A mixture of 45 g. (1 mol.) of 2-tetralone, 20 g. (1 mol.) of malononitrile, 2.5 g. of ammonium acetate, 4 ml. of acetic acid and 100 ml. of chloroform was refluxed for 4 hours. The water was collected in a Dean and Stark distillation receiver. The reaction mixture was concentrated to dryness and the residue was stirred in water. The solid was collected on a filter and washed with water. The intermediate was recrystallized from methanol. The yield of colorless crystals was 22% and they had a M.P. of 102–103° C.

*Example 6.—1-dicyanomethylene-2-(3-methyl-2(3H)-benzothiazolylidene)indan*

A mixture of 5.4 g. (1 mol. plus 50% excess) of 1-dicyanomethyleneindan, 7.4 g. (1 mol.) of 3-methyl-2-methylmercaptobenzothiazolium p-toluenesulfonate, 6.06 g. (1 mol. plus 200% excess) of triethylamine and 50 ml. of ethanol was heated at the refluxing temperature for 15 minutes. The reaction mixture was chilled and the solid was collected on a filter and washed with methanol. The solid was stirred in hot methanol, the suspension was filtered hot, and the solid was washed with methanol. The dye was dissolved in hot pyridine, the solution was filtered, methanol was added, and after chilling the dye was collected on a filter and the dye was washed with methanol. After another such purification, the yield of dye was 35%. The felt of orange crystals had a M.P. of 245–246° C. with decomposition, and they sensitized a photographic gelatino-silver-bromoiodide emulsion to about 565 mµ with maximum sensitivity at about 545 mµ.

*Example 7.—1-dicyanomethylene-2-[(3-ethyl-2(3H)-benzothiazolylidene)ethylidene]indan*

A mixture of 5.4 g. (1 mol.) of 1-dicyanomethyleneindan, 13.5 g. (1 mol.) of 2-(2-acetanilidovinyl)-3-ethylbenzothiazolium iodide, 6.0 g. (1 mol. plus 100% excess) of triethylamine and 50 ml. of ethanol was heated at the refluxing temperature for 30 minutes. The reaction mixture was chilled, the solid was collected on a filter and washed with methanol. The dye was dissolved in hot pyridine, the solution was filtered, methanol was added, and after chilling the dye was collected on a filter and washed with methanol. After another such purification, the dye was recrystallized from pyridine. The shiny green needles had a M.P. of 259–260° C. with decomposition and they sensitized a photographic gelatino-silver-bromoiodide emulsion to about 680 mµ with a maximum sensitivity at about 660 mµ.

*Example 8.—1-dicyanomethylene-2-[(3-ethyl-2(3H)-benzothiazolylidene)-2-butenylidene]indan*

A mixture of 0.9 g. (1 mol.) of 1-dicyanomethyleneindan, 2.38 g. (1 mol.) of 2-(4-acetanilido-1,3-butadienyl)-3-ethylbenzothiazolium iodide, 1.0 g. (1 mol. plus 100% excess) of triethylamine and 15 ml. of ethanol was heated at the refluxing temperature for 15 minutes. The reaction mixture was chilled, the solid was collected on a filter and washed with methanol. The dye was dissolved in hot pyridine, the solution was filtered, methanol was added, and after chilling the dye was collected on a filter and washed with methanol. After another such purification, the yield of dye was 36%. The shiny dark green crystals had a M.P. of 240–241° C. with decomposition.

*Example 9.—1-dicyanomethylene-2-(3-methyl-2(3H)-benzoxazolylidene)indan*

A mixture of 3.32 g. (2 mol.) of 2-methylmercaptobenzoxazole and 3.72 g. (2 mol.) of methyl p-toluenesulfonate was heated to the boiling point over a free flame. The reaction mixture was chilled and washed with two successive portions of ether. To the sticky residue, 1.8 g. (1 mol.) of 1-dicyanomethyleneindan, 2.0 g. (2 mol.) of triethylamine and 15 ml. of ethanol were added. The reaction mixture was heated at the refluxing temperature for 10 minutes. After chilling, the solid was collected on a filter and washed with methanol. After two recrystallizations from ethanol, the yield of dye was 28%. The dark reddish-brown crystals had a M.P. of 230–231° C. with decomposition, and they sensitized a photographic gelatino-silver-bromoiodide emulsion to about 510 m$\mu$ with maximum sensitivity at about 490 m$\mu$.

*Example 10.—1-dicyanomethylene-2-(1-methyl-2(1H)-naphtho[1,2]thiazolylidene)indan*

A mixture of 0.7 g. (1 mol.) of 1-dicyanomethyleneindan, 3.57 g. (1 mol. plus 100% excess) of 1-methyl-2-methylmercaptonaphtho[1,2]thiazolium methylsulfate, 1.0 g. (1 mol. plus 100% excess) of triethylamine and 15 ml. of ethanol was heated at the refluxing temperature for 10 minutes. The reaction mixture was chilled, the solid was collected on a filter and washed with methanol. The dye was dissolved in hot pyridine, the solution was filtered, and after chilling the dye was collected on a filter and washed with methanol. After another such purification, the yield of dye was 55%. The red crystals with a gold reflex had a M.P. of 265–267° C. with decomposition, and they sensitized a photographic gelatino-silver-bromoiodide emulsion to about 575 m$\mu$ with maximum sensitivity at about 550 m$\mu$.

*Example 11.—1-dicyanomethylene-2-(1-ethyl-2(1H)-quinolylidene)indan*

A mixture of 0.9 g. (1 mol.) of 1-dicyanomethyleneindan, 2.19 g. (1 mol. plus 100% excess) of 1-ethyl-2-phenylmercaptoquinolinium p-toluenesulfonate, 1.0 g. (1 mol. plus 100% excess) of triethylamine and 15 ml. of ethanol was heated at the refluxing temperature for 10 minutes. The reaction mixture was stirred in water, the water was decanted, the residue was stirred in two successive portions of ether, the residue was stirred in methanol, the solid was collected on a filter and washed with methanol. The dye was dissolved in hot pyridine, the solution was filtered and after chilling, the dye was collected on a filter and washed with methanol. After another such purification, the yield of dye was 19%. The dark coppery crystals had a M.P. of 227–228° C. with decomposition.

*Example 12.—1-dicyanomethylene-2-[(1-ethyl-2(1H)-naphtho[1,2]thiazolylidene)isopropylidene]indane*

A mixture of 0.9 (1 mol.) of 1-dicanomethyleneindan, 2.19 g. (1 mol.) of 1-ethyl-2-(2-ethylmercaptopropenyl)-naphtho[1,2]thiazolium ethylsulfate, 1.0 g. (1 mol. plus 100% excess) of triethylamine and 15 ml. of ethanol was heated at the refluxing temperature for 15 minutes. The reaction mixture was chilled, the solid was collected on a filter and washed with methanol. The dye was dissolved in hot pyridine, the solution was filtered, methanol was added, and after chilling the dye was collected on a filter and washed with methanol. The yield of dye was 1%. The dark crystals with coppery reflex had a M.P. of 191–193° C. with decomposition, and they sensitized a photographic gelatino-silver-bromoiodide emulsion.

*Example 13.—2dicyanomethylene-1-(3-ethyl-2(3H)-benzothiazolylidene)indan*

A mixture of 2.0 g. (1 mol.) of 2-dicyanomethylene-indan, 3.49 g. (1 mol. plus 10% excess) of 3-ethyl-2-ethylmercaptobenzothiazolium ethylsulfate, 1.1 g. (1 mol. plus 10% excess) of triethylamine and 25 ml. of ethanol was heated at the refluxing temperature for 15 minutes. The reaction mixture was chilled, the solid was collected on a filter and washed with methanol. The dye was dissolved in hot pyridine, the solution was filtered, methanol was added and after chilling the dye was collected on a filter and washed with methanol. After another such purification, the yield of dye was 46%. The dark green crystals with a green reflex had a M.P. of 256–258° C. with decomposition.

*Example 14*

In a like manner, 2- dicyanomethylene-1-[(3-ethyl-2 (3H)-benzothiazolylidene)ethylidene]indan was prepared from 5.4 g. (1 mol.) of 2-dicyanomethyleneindan, 13.5 g. (1 mol.) of 2-(2-acetanilidovinyl)-3-ethylbenzothiazolium iodide, 3.3 g. (1 mol. plus 10% excess) of triethylamine and 50 ml. of ethanol. The yield of dye, after one more recrystallization from pyridine was 21%. The green crystals with a coppery reflex had a M.P. of 246–250° C. with decomposition.

*Example 15*

In a like manner, 2-dicyanomethylene-1-[(3-ethyl-2 (3H)-benzothiazolylidene)-2-butenylidene]indan was prepared from 5.4 g. (1 mol. of 2-dicyanomethyleneindan, 9.52 g. (1 mol.) of 2-(4-acetanilido-1,3-butadienyl)-3-ethylbenzothiazolium iodide, 3.3 g. (1 mol. plus 10% excess) of triethylamine and 75 ml. of ethanol. The yield of dark green crystals was 22% and they had a M.P. of 28–230° C.

*Example 16*

In a like manner, 2-dicyanomethylene-1-[(3-ethyl-2 (3H)-benzoxazolylidene)ethylidene]indan was prepared from 5.4 g. (1 mol.) of 2-dicyanomethyleneindan, 12.72 g. (1 mol.) of 2-(2-acetanilidovinyl)-3-ethylbenzoxazolium iodide, 3.3 g. (1 mol. plus 10% excess) of triethylamine and 75 ml. of ethanol. The yield of shiny green crystals was 28% and they melted at 214–215° C. with decomposition.

*Example 16A.—2-dicyanomethylene-1,3-di(3-methyl-2(3H)-benzothiazolylidene)indan*

A mixture of 1.8 g. (1 mol.) of 2-dicyanomethylene-indan, 8.4 g. (2 mol. plus 17% excess) of 3-methyl-2-methylcercaptobenzothiazolium p-toluenesulfonate, 2.2 g. (2 mol. plus 10% excess) of triethylamine and 25 ml. of ethanol was heated at the refluxing temperature for 10 minutes. The reaction mixture was chilled, the solid was collected on a filter and washed with methanol. The dye was dissolved in hot cresol, the solution was filtered, methanol was added, and after chilling the dye was collected on a filter and washed with copious amounts of methanol. After another such purification, the yield of dye was 32%. The dark needles with a green reflex had a M.P. of >310° C. and they sensitized a photographic gelatino-silver-bromoiodide emulsion to about 610 m$\mu$ with maximum sensitivity at about 565 m$\mu$.

*Example 17.—2-dicyanomethylene-1,3-di[(3-ethyl-2(3H)-benzothiazolylidene)ethylidene]indan*

A mixture of 1.98 g. (1 mol.) of 2-dicyanomethylene-1-[(3-ethyl - 2(3H) - benzothiazolylidene)ethylidene]indan, 2.25 g. (1 mol.) of 2-(2-acetanilidovinyl)-3-ethyl-benzothiazolium iodide, 0.6 g. 1 mol. plus 10% excess) of triethylamine and 15 ml. of pyridine was heated at the refluxing temperature for 10 minutes. The reaction mixture was chilled, the solid was collected on a filter and washed with methanol. The dye was extracted with two 350 ml. portions of hot pyridine. The yield of dye after extractions was 33%. The dark green crystals had a M.P. of 288–289° C. and they sensitized a photographic gelatino-silver-bromoiodide emulsion to about 780 m$\mu$ with maximum sensitivity at about 690 m$\mu$.

*Example 18.—2-dicyanomethylene-1,3-di[(3-ethyl-2(3H)-benzothiazolylidene)-2-butenylidene]indan*

A mixture of 2.14 g. (1 mol.) of 2-dicyanomethylene-1-[(3-ethyl-2(3H) - benzothiazolylidene) - 2 - butenylidene]indan, 2.38 g. (1 mol.) of 2-(4-acetanilido-1,3-butadienyl)-3-ethyl-benzothiazolium iodide, 0.6 g. (1 mol. plus 10% excess) of triethylamine and 15 ml. of pyridine was heated at the refluxing temperature for 10 minutes. The reaction mixture was stirred in water and the water was decanted. The residue was stirred in two successive portions of hot methanol, the solid was collected on a filter and washed with hot methanol. The dye was dissolved in hot pyridine, the solution was filtered, methanol was added, and after chilling the dye was collected on a filter and washed with methanol. After another such purification, the yield of dye was 13%. The dark crystals had a M.P. of 237–238° C. with decomposition and they sensitized a photographic gelatino-silver-chlorobromide emulsion to about 690 m$\mu$ with maximum sensitivity at about 630 m$\mu$.

*Example 19.—2-dicyanomethylene-1-[(3-ethyl-2(3H)-benzothiazolylidene)-2-butenylidene]-3-[(3-ethyl-2(3H)-benzothiazolylidene)ethylidene]indan*

A mixture of 1.98 g. (1 mol.) of 2-dicanomethylene-1-[(3-ethyl - 2(3H) - benzothiazolylidene)ethylidene)indan, 2.38 g. (1 mol.) of 2-(4-acetanilido-1,3-butadienyl)-3-ethylbenzothiazolium iodide, 0.6 g. (1 mol. plus 10% excess) of triethylamine and 15 ml. of pyridine was heated at the refluxing temperature for 10 minutes. The reaction mixture was stirred in water, the residue was collected on a filter and washed with methanol. The dye was dissolved in hot pyridine, the solution was filtered, methanol was added, and after chilling the solid was collected on a filter and washed with methanol. After another such purification, the yield of dye was 35%. The black crystals had a M.P. of 244–245° C. with decomposition, and they sensitized a photographic gelatino-silver-bromoiodide emulsion to about 840 m$\mu$ with maximum sensitivity at about 810 m$\mu$.

*Example 20.—2-dicyanomethylene-1-[(3-ethyl-2(3H)-benzothiazolylidene)ethylidene]-3-[(3-ethyl-2(3H)-benzoxazolylidene)ethylidene]indan*

A mixture of 1.9 g. (1 mol.) of 2-dicyanomethylene-1-[(3 - ethyl - 2(3H) - benzoxazolylidene)ethylidene]indan, 2.25 g. (1 mol.) of 2-(2-acetanilidovinyl)-3-ethylbenzothiazolium iodine, 0.6 g. (1 mol. plus 10% excess) of triethylamine and 15 ml. of pyridine was heated at the refluxing temperature for 15 minutes. The reaction mixture was stirred in water. The solid was collected on a filter and washed with methanol. The dye was dissolved in hot pyridine, the solution was filtered, methanol was added, and after chilling the dye was collected on a filter and washed with methanol. After another such purification, the yield of dye was 45%. The silver-gray needles had a M.P. of 255–256° C. with decomposition, and they sensitized a photographic gelatino-silver-bromoiodide emulsion to about 730 m$\mu$ with maximum sensitivity at about 685 m$\mu$.

*Example 21.—1,3-diethyl-5[1-(3-methyl-2(3H)-benzothiazolylidene)-indan-2-ylidene]barbituric acid*

A mixture of 6.56 g. (1 mol. plus 10% excess) of 1,3-diethyl-5-(indan-2-ylidene)barbituric acid, 7.14 g. (1 mol.) of 3-methyl-2-methylmercaptobenzothiazolium p-toluenesulfonate, 2.0 g. (1 mol.) of triethylamine and 25 ml. of ethanol was heated at the refluxing temperature for 10 minutes. The reaction mixture was chilled, the solid was collected on a filter and washed with methanol. The solid was extracted in a soxhlet with ether to remove 1,3-diethyl-5-(indan-2-ylidene)barbituric acid. The yield of dye after two recrystallizations from pyridine was 12%. The reddish-brown crystals had a M.P. of 272–273° C. with decomposition.

*Example 22.—1,3-diethyl-5-[1,3-di(3-methyl-2(3H)-benzothiazolylidene)indan-2-ylidene]barbituric acid*

A mixture of 5.96 g. (1 mol) of 1,3-diethyl-5-(indan-2-ylidene)barbituric acid, 14.28 g. (2 mol.) of 3-methyl-2-methylmercaptobenzothiazolium p-toluenesulfonate, 4.0 g. (2 mol.) of triethylamine, and 25 ml. of ethanol was heated at the refluxing temperature for 15 minutes. The reaction mixture was chilled, the solid was collected on a filter and the solid was extracted with ether. The dye was dissolved in hot pyridine, the solution was filtered, water was added, and after chilling the dye was collected on a filter and washed with water. After a recrystallization from ethanol, the yield of dye was 28%. The red crystals with a green reflex had a M.P. > 310° C.

*Example 23.—1,3diethyl-5-{[1,3-di(3-ethyl-2(3H)-benzothiazolylidene)ethylidene]indan-2-ylidene}barbituric acid*

A mixture of 1,3-diethyl-5-(indan-2-ylidene)barbituric acid, 4.5 g. (2 mol.) of 2-(2-acetanilidovinyl)-3-ethylbenzothiazolium iodide, 4.0 g. (2 mol. plus 100% excess) of triethylamine and 30 ml. of ethanol was heated at the refluxing temperature for 10 minutes. The solid was collected on a filter from the hot reaction mixture and the solid was washed with methanol. The dye was dissolved in hot cresol, the solution was filtered, methanol was added, and after chilling the dye was collected on a filter and washed with copious quantities of methanol. After another such purification, the yield of dye was 61%. The olive-green crystals had a M.P. > 310° C. and they sensitized a photographic gelatino-silver-bromoiodide emulsion to about 770 mμ with maximum sensitivity at about 750 mμ.

*Example 24.—1,3-diethyl-5-{[1,3-di(3-ethyl-2(3H)-benzoxazolylidene)ethylidene]indan-2-ylidene}barbituric acid*

A mixture of 1.49 g. (1 mol.) of 1,3-diethyl-5-(indan-2-ylidene)barbituric acid, 4.34 g. (2 mol.) of 2-(2-acetanilidovinyl)-3-ethylbenzoxazolium iodide, 2.0 g. (2 mol. plus 100% excess) of triethylamine and 25 ml. of ethanol was heated at the refluxing temperature for 10 minutes. The reaction mixture was chilled, the solid was collected on a filter and washed with methanol. The dye was dissolved in hot cresol, the solution was filtered, methanol was added, and after chilling the dye was collected on a filter and washed with copious quantities of methanol. After another such purification, the yield of dye was 41%. The shiny green crystals had a M.P. of 280–281° C. with decomposition, and they sensitized a photographic gelatino-silver-bromoiodide emulsion to about 720 mμ with maximum sensitivity at about 680 mμ.

*Example 25.—1,3 - diethyl - 5 - [1,3-di(1-methyl-2(1H)-naphtho[1,2] - thiazolylidene)indan - 2 - ylidene]barbituric acid*

A mixture of 1.46 g. (1 mol.) of 1,3-diethyl-5-(indan-2-ylidene)barbituric acid, 4.6 g. (2 mol. plus 10% excess) of 1-methyl-2-methylmercaptonaphtho[1,2]thiazolium p-toluenesulfonate, 1.1 g. (2 mol. plus 10% excess) of triethylamine and 15 ml. of pyridine was heated at the refluxing temperature for 10 minutes. The reaction mixture was stirred in water, the residue was dissolved in pyridine and water was added. The solid was collected on a filter and washed with water. The dye was dissolved in hot pyridine, the solution was filtered, water was added, and after chilling the solid was collected on a filter and washed with water. After another such purification, substituting ethanol for pyridine, the yield of dye was 62%. The dark crystals had a M.P. of 242–243° C. with decomposition, and they sensitized a photographic gelatino-silver-bromoiodide emulsion to about 620 mμ with maximum sensitivity at about 590 mμ.

*Example 26.—1,3 - diethyl - 5 - {1-[(3-ethyl-2(3H)-benzothiazolylidene) - 2 - butadienylidene] - 3 - (3-methyl-2(3H) - benzothiazolylidene)indan - 2 - ylidene}barbituric acid*

A mixture of 1.11 g. (1 mol.) of 1,3-diethyl-5-[1-(3-methyl - 2(3H) - benzothiazolylidene)indan - 2 - ylidene] barbituric acid, 1.23 g. (1 mol. plus 10% excess) of 2-(4-acetanilido-1,3-butadienyl)-3-ethylbenzothiazolium iodide, 0.6 g. (1 mol. plus 10% excess) of triethylamine and 15 ml. of pyridine was heated at the refluxing temperature for 10 minutes. The reaction mixture was stirred in methanol and after chilling the solid was collected on a filter and washed with methanol. The dye was dissolved in hot cresol, the solution was filtered, methanol was added and after chilling the dye was washed with copious quantities of methanol. After another such purification, the yield of dye was 27%. The green crystals with a coppery reflex had a M.P. of 285–286° C. with decomposition, and they sensitized a photographic gelatino-silver-bromoiodide emulsion to about 810 mμ with maximum sensitivity at about 730 mμ.

*Example 27.*—*1,3 - diethyl - 5 - [1-(3-methyl-2(3H)-benzothiazolylidene) - 3 - (1-methyl-2(1H)-naphtho[1,2] thiazolylidene)indan-2-ylidene]barbituric acid*

A mixture of 1.11 g. (1 mol.) of 1,3-diethyl-5-[1-(3-methyl - 2(3H) - benzothiazolylidene)indan - 2 - ylidene] barbituric acid, 2.08 g. (2 mol. plus 10% excess) of 1-methyl - 2 - methylmercaptonaphtho[1,2]thiazolium p-toluenesulfonate, 0.6 g. (2 mol. plus 10% excess) of triethylamine and 20 ml. of pyridine was heated at the refluxing temperature for 10 minutes. The reaction mixture was stirred in water, the residue was dissolved in pyridine and water was added. After chilling the solid was collected on a filter and washed with water. The dye was dissolved in hot pyridine, the solution was filtered, water was added, and after chilling the dye was collected on a filter and washed with water. After another such purification, using ethanol for pyridine, the yield of dye was 54%. The dark red crystals with a green reflex had a M.P. of 231–232° C. with decomposition and they sensitized a photographic gelatino-silver-bromoiodide emulsion to about 575 mμ with maximum sensitivity at about 555 mμ.

*Example 28.*—*1-dicyanomethylene-1,2,3,4-tetrahydro-2-(3-methyl-2(3H)-benzothiazolylidene)naphthalene*

A mixture of 0.97 g. (1 mol.) of 1-dicyanomethylene-1,2,3,4-tetrahydronaphthalene, 3.57 g. (1 mol. plus 100% excess) of 3-methyl-2-methylmercaptobenzothiazolium p-toluenesulfonate, 1.0 g. (1 mol. plus 100% excess) of triethylamine and 15 ml. of ethanol was heated at the refluxing temperature for 10 minutes. The reaction mixture was chilled, the solid was collected on a filter and washed with methanol. The dye was dissolved in hot pyridine, the solution was filtered, methanol added, and after chilling the dye was collected on a filter and washed with methanol. After another such purification, the yield of dye was 76%. The shiny red crystals had a M.P. of 232–233° C. with decomposition and they sensitized a photographic gelatino-silver-bromoiodide emulsion to about 555 mμ.

*Example 29*

In a like manner, 1-dicyanomethylene-1,2,3,4-tetrahydro - 2 - (1 - methyl - 2(1H)-naphtho[1,2]thiazolylidene) naphthalene was prepared from 0.97 g. (1 mol.) of 1-dicyanomethylene-1,2,3,4-tetrahydronaphthalene, 4.12 g. (1 mol. plus 100% excess) of 1-methyl-2-methylmercaptonaphtho[1,2]thiazolium methylsulfate, 1.0 g. (1 mol. plus 100% excess) of triethylamine and 15 ml. of ethanol. The yield of dye was 80%. The red-brown crystals with a green reflex had a M.P. of 289–290° C. with decompositon and they sensitized a photographic gelatino-silver-bromoiodide emulsion to about 580 mμ with maximum sensitivity at about 555 mμ.

*Example 30*

In a like manner, 1 - dicyanomethylene-2-(1-ethyl-2 (1H) - quinolylidene)-1,2,3,4-tetrahydronaphthalene was prepared from 0.97 g. (1 mol.) of 1-dicyanomethylene-1, 2,3,4-tetrahydronaphthalene, 4.37 g. (1 mol. plus 100% excess) of 1-ethyl-2-phenylmercapto-quinolinium p-toluenesulfonate, 1.0 g. (1 mol. plus 100% excess) of triethylamine and 15 ml. of ethanol. The yield of dye was 33%. The shiny coppery-red crystals had a M.P. of 285–286° C. with decomposition.

*Example 31*

In a like manner, 1-dicyanomethylene-2-[(3-ethyl-2 (3H) - benzoxazolylidene)ethylidene]-1,2,3,4-tetrahydronaphthalene was prepared from 0.97 g. (1 mol.) of 1-dicyanomethylene-1,2,3,4-tetrahydronaphthalene, 2.4 g. (1 mol. plus 10% excess) of 2-(2-acetanilidovinyl)-3-ethylbenzoxazolium iodide, 1.0 g. (1 mol. plus 100% excess) of triethylamine and 25 ml. of ethanol. The yield of dye was 19%. The shiny green needles had a M.P. of 213–214° C. with decomposition and they sensitized a photographic gelatino-silver-bromoiodide emulsion to about 690 mμ with maximum sensitivity at about 600 mμ.

*Example 32*

In a like manner, 1-dicyanomethylene-1,2,3,4-tetrahydro-2-[(3-methyl-2(3H)-benzothiazolylidene)ethylidene]-naphthalene was prepared from 0.97 g. (1 mol.) of 1-dicyanomethylene-1,2,3,4-tetrahydronaphthalene, 2.4 g. (1 mol. plus 10% excess) of 2-(2-acetanilidovinyl)-3-methylbenzothiazolium iodide, 1.0 g. (1 mol. plus 100% excess) of triethylamine and 25 ml. of ethanol. Before the pyridine-methanol purification, the crude dye was stirred three times in hot methanol. The yield of dye was 5%. The shiny green needles had a M.P. of 231–232° C. with decompositon, and they sensitized a photographic gelatino-silver-bromoiodide emulsion to about 690 mμ with maximum sensitivity at about 580 mμ.

We have found that the intermediates of Formula V or Formula VII can be condensed with intermediates of the type represented by Formula V in column 3 of Heseltine and Brooker U.S. Patent 2,927,026, issued March 1, 1960, to provide merocyanine dyes corresponding to those of Formula III and Formula IV, wherein $d$ is 2 and wherein the methine group contiguous to the ring represented by $D_1$ contains a substituent, such as alkyl (e.g., methyl, ethyl, propyl, etc.), or aryl (e.g., phenyl, tolyl, etc.). Where this alkyl group is methyl, it remains reactive and can be reacted with a second molecule of an intermediate of Formula V of U.S. Patent 2,927,026 to provide complex holopolar dyes. The preparation of a merocyanine dye corresponding to those of Formula IV above, wherein $d$ is 2 and the methine chain contains a methyl subsituent, is given in Example 12 above. As indicated in Example 12, the dyes thus obtained can also be usefully employed to sensitize photographic silver halide emulsions. Similar dyes corresponding to those of Formula III, wherein $d$ is 2 and the intracyclic chain contains a substituent can be prepared using the general method of Example 12.

It will be noted that the dyes of our invention represented by Formulas I and II have been named in their uncharged state, although the formulas have been written in the charged form. It is possible, of course, to write the structures of these dyes in an uncharged state, for example, as follows (for Formula I):

wherein R, $R_1$, $d$, $m$, $n$, $p$, $q$, D, Q, Z and $Z_1$ each have the values given above. While the above structure represents a non-ionic representation of the dye of Formula I, it is possible to assign a related structure to the dyes of Formula II.

As shown in the above examples, many of the dyes of our invention are particularly useful in manufacturing photographic, silver halide emulsions, serving to alter the sensitivity thereof. Sensitization by means of our new dyes is, of course, directed primarily to the ordinarily employed, gelatino-silver, halide, developing-out emulsions. The dyes are advantageously incorporated in the washed, finished emulsion and should, of course, be uniformly distributed throughout the emulsion. In the preparation of photographic emulsions containing our new dyes, it is only necessary to disperse the dyes in the emulsions. The methods of incorporating dyes in emulsion are simple and well known to those skilled in the art of emulsion making. It is convenient to add the dyes from solutions in appropriate solvents. The solvent must, of course, be compatible with the emulsion and substantially free from any deleterious effect on the light-sensitive materials. Pyridine has proven satisfactory as a solvent for the majority of our new dyes.

The concentration of our new dyes in the emulsion can vary widely, i.e., from about 5 to about 100 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of our new dyes, the following procedure is satisfactory: A quantity of the dye is dissolved in pyridine or other suitable solvent and a volume of this solution (which may be diluted with methanol) containing from 5 to 100 mgs. of dye is slowly added to about 1000 cc. of a gelatino-silver-halide emulsion, with stirring. Stirring is continued until the dye is uniformly distributed throughout the emulsion. With most of our new dyes, 10 to 20 mgs. of dye per liter of emulsion suffices to produce the maximum sensitizing effect with the ordinary gelatino-silver-bromide (including bromoiodide) emulsions. With fine-grain emulsions, which include most of the ordinarily employed gelatino-silver-chloride emulsions, somewhat larger concentrations of dye may be necessary to secure the optimum sensitizing effect.

The above statements are only illustrative and are not to be understood as limiting our invention in any sense, as it will be apparent that our new dyes can be incorporated by other methods in many of the photographic silver halide emulsions customarily employed in the art. For instance, the dyes can be incorporated by bathing a plate or film upon which an emulsion has been coated, in the solution of the dye, in an appropriate solvent. Bathing methods, however, are not to be preferred ordinarily.

Photographic silver halide emulsions, such as those listed above, containing the sensitizing dyes of our invention can also contain such addenda as chemical sensitizers, e.g., sulfur sensitizers (e.g., allyl thiocarbamide, thiourea, allylisothiocyanate, cystine, etc.), various gold compounds (e.g., potassium chloroaurate, auric trichloride, etc.) (see U.S. Patents 2,540,085; 2,597,856 and 2,597,915), various palladium compounds such as palladium chloride (U.S. 2,540,086), potassium chloropalladate (U.S. 2,598,-079), etc., or mixtures of such sensitizers; antifoggants, such as ammonium chloroplatinate (U.S. 2,566,245), ammonium chloroplatinite (U.S. 2,566,263), benzothiazole, nitrobenzimidazole, 5-nitroindazole, benzidine, mercaptans, etc. (see Mees—"The Theory of the Photographic Process," MacMillan Pub., 1942, page 460), or mixtures thereof; hardeners, such as formaldehyde (U.S. 1,763,-533), chrome alum (U.S. 1,763,533), glyoxal (U.S. 1,870,354), dibromacrolein (British 406,750), etc.; color couplers, such as those described in U.S. Patent 2,423,730, Spence and Carroll (U.S. Patent 2,640,776), etc.; or mixtures of such addenda. Dispersing agents for color couplers, such as those set forth in U.S. Patents 2,322,027 and 2,304,940, can also be employed in the above-described emulsions.

Figure 2:
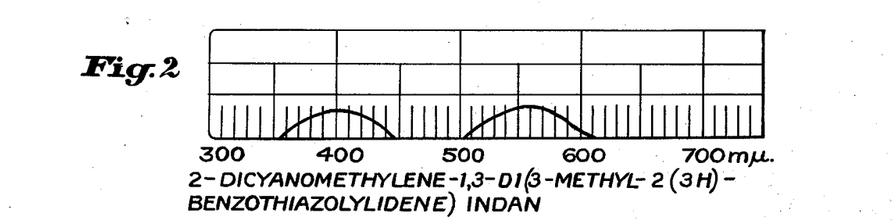
Figure 3:
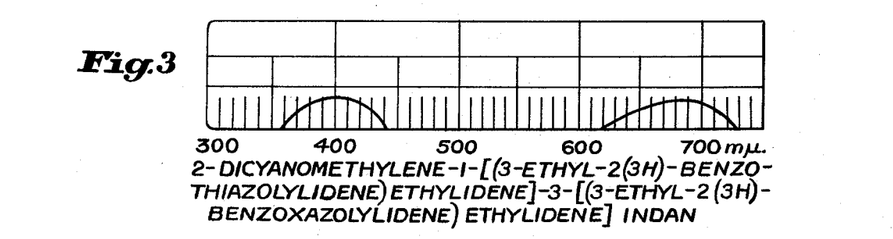

The merocyanine and holopolar dyes of our invention have unique sensitizing properties in that maximum absorption is shifted bathochromically about 100 millimicrons as compared with similar dyes having no arylene-chain substitution. This unique effect is illustrated in FIGURES 1–3 of the accompanying drawing.

The accompanying drawing illustrates the sensitizing effect obtained with three of our novel spectral sensitizing dyes in gelatino-silver-bromiodide or -chlorobromide emulsions. The solid line in each figure of the drawing is a diagrammatic reproduction of one spectrogram. The inherent sensitivity of the emulsion is within the region of about 400 millimicrons and the sensitivity contributed by the sensitizing dye is represented by the right-hand portion of the solid curve.

Figure 1:
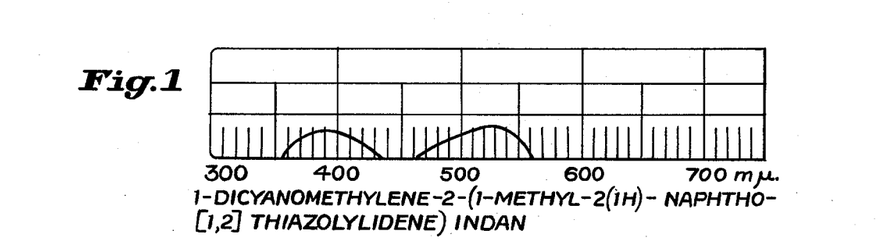

In FIGURE 1, the solid curve represents the sensitivity of an ordinary gelatino-silver-chlorobromide emulsion sensitized with 1 - dicyanomethylene-2-(1-methyl-2(1H)-naphtho - [1,2]thiazolylidene)indan. The preparation of this sensitizing dye is given in Example 10 above.

What we claim as our invention and desire secured by Letters Patent of the United States is:

1. A compound selected from the group consisting of those represented by the following formula:

wherein R represents an alkyl group containing from 1 to 4 carbon atoms, $R_2$ represents a member selected from the class consisting of the cyano group and an alkoxycarbonyl group containing from 2 to 3 carbon atoms, $d$ represents a positive integer of from 1 to 3, $n$ represents a positive integer of from 1 to 2, $D_1$ represents the atoms necessary to complete a ring selected from the class consisting of an indan ring and a 1,2,3,4-tetrahydronaphthalene ring, such that the benzene ring of said indan ring and said 1,2,3,4-tetrahydronaphthalene ring is substituted with a group selected from the class consisting of the hydrogen atom, a halogen atom, the hydroxyl group, the methoxy group, the ethoxy group, the methyl group and the ethyl group, and Z represents the non-metallic atoms necessary to complete a heterocyclic nucleus selected from the class consisting of a thiazole nucleus, a benzothiazole nucleus, a naphthothiazole nucleus, a benzoxazole nucleus, a naphthoxazole nucleus, a benzoselenazole nucleus, a naphthoselenazole nucleus, a 2-quinoline nucleus, and a 4-quinoline nucleus.

2. A compound selected from the group consisting of those represented by the following two formulas:

zole nucleus, a 3,3-dialkylindolenine nucleus, a 2-pyridine nucleus and a 4-pyridine nucleus.

3. A compound selected from the group consisting of those represented by the formula:

I.

and

II.

wherein R and $R_1$ each represents a lower alkyl group, $R_2$ represents a member selected from the class consisting of the cyano group and a lower alkoxycarbonyl group, $d$ and $q$ each represents a positive integer of from 1 to 3, $m$, $n$ and $p$ each represents a positive integer of from 1 to 2, D represents the atoms necessary to complete a ring selected from the class consisting of benzene, a halogenated benzene, a hydroxysubstituted benzene, a methoxysubstituted benzene, an ethoxysubstituted benzene, a methylsubstituted benzene and an ethylsubstituted benzene, Q represents the non-metallic atoms necessary to complete a nucleus selected from the class consisting of an indandione nucleus, a pyrazolone nucleus, an isoxazolone nucleus, an oxindole nucleus, a 2,4,6-triketohexahydropyrimidine nucleus, a 2-thio-4,6-diketohexahydropyrimidine nucleus, a rhodanine nucleus, a 2(3H)-imidazo-[1,2-a]pyridone nucleus, a 5,7-dioxo-6,7-dihydro-5-thiazolo[3,2-a]-pyrimidine nucleus, a 2-thio-2,4-oxazolidinedione nucleus, a thianaphthenone nucleus, a 2-thio-2,5-thiazolidinedione nucleus, a 2,4-thiazolidinedione nucleus, a thiazolidinone nucleus, a 4-thiazolinone nucleus, a 2-imino-2,4-oxazolinone nucleus, a 2,4-imidazolinedione nucleus, a 2-thio-2,4-imidazolinedione nucleus and a 5-imidazolinone nucleus, and $Z_2$ and $Z_3$ each, represents the non-metallic atoms necessary to complete a heterocyclic nucleus selected from the class consisting of a thiazole nucleus, a benzothiazole nucleus, a naphthothiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a 2-quinoline nucleus, a 4-quinoline nucleus, a 1-isoquinoline nucleus, a 3-isoquinoline nucleus, a benzimidawherein R represents an alkyl group containing from 1 to 4 carbon atoms, $d$ represents a positive integer of from 1 to 3, $n$ represents a positive integer of from 1 to 2, $D_1$ represents the atoms necessary to complete a ring selected from the class consisting of an indan ring and a 1,2,3,4-tetrahydronaphthalene ring, such that the benzene ring of said indan ring and said 1,2,3,4-tetrahydronaphthalene ring is substituted with a group selected from the class consisting of the hydrogen atom, a halogen atom, the hydroxyl group, the methoxy group, the ethoxy group, the methyl group and the ethyl group, Q represents the non-metallic atoms necessary to complete a nucleus selected from the class consisting of an indandione nucleus, a pyrazolone nucleus, an isoxazolone nucleus, an oxindole nucleus, a 2,4,6-triketohexahydropyrimidine nucleus, a 2-thio-4,6-diketohexahydropyrimidine nucleus, a rhodanine nucleus, a 2(3H)-imidazo[1,2-a]pyridone nucleus, a 5,7-dioxo-6,7-dihydro-5-thiazolo[3,2-a]pyrimidine nucleus, a 2-thio-2,4-oxazolidinedione nucleus, a thionaphthenone nucleus, a 2-thio-2,5-thiazolidinedione nucleus, a 2,4-thiazolidinedione nucleus, a thiazolidinone nucleus, a 4-thiazolinone nucleus, a 2-imino-2,4-oxazolinone nucleus, a 2,4-imidazolinedione nucleus, a 2-thio-2,4-imidazolinedione nucleus, and a 5-imidazolinone nucleus, and Z represents the non-metallic atoms necessary to complete a heterocyclic nucleus selected from the class consisting of a thiazole nucleus, a benzothiazole nucleus, a naphthothiazole nucleus, a benzoxazole nucleus, a napththoxazole nucleus, a benzoselenazole nucleus, a naphthoselenazole nucleus, a 2-quinoline nucleus, and a 4-quinoline nucleus.

(References on following page)

References Cited by the Examiner

UNITED STATES PATENTS

| | | | |
|---|---|---|---|
| 1,969,445 | 8/34 | Brooker | 96—105 |
| 2,395,879 | 3/46 | Kendall et al. | 260—240.1 |
| 2,586,164 | 2/52 | Hensley | 96—105 |
| 2,715,622 | 8/55 | Gerzon et al. | 260—240 |
| 2,856,404 | 10/58 | Brooker et al. | 260—240 |
| 2,955,939 | 10/60 | Brooker et al. | 260—240.1 XR |
| 2,965,486 | 12/60 | Brooker et al. | 260—240 XR |

FOREIGN PATENTS

| | | |
|---|---|---|
| 579,112 | 5/59 | Belgium. |
| 1,231,268 | 4/60 | France. |

OTHER REFERENCES

Chemical Abstracts, 16, 3101.
Chemical Abstracts, 19, 530.
Coenen et al.: Zeitschrift fur Elektochemie, vol. 57, pages 785 to 795 (1953).
Peters et al.: J. of Pharmacology and Exptl. Therapy, vol. 95, pages 226–233 (1949).
Venkataraman: The Chemistry of Synthetic Dyes, vol. 2, pages 1177 to 1183 and 1185 to 1186, Academic Press Inc., N.Y. (1952).
Welch et al.: Science, vol. 105, pages 486 to 488 (1947).

WALTER A. MODANCE, *Primary Examiner.*

PHILIP E. MANGAN, JOHN D. RANDOLPH, NICHOLAS S. RIZZO, *Examiners.*